United States Patent

[11] 3,585,506

[72] Inventors Zen'iti Kiyasu
Musashino-shi;
Tetsuya Miki, Sendai-shi, both of, Japan

[21] Appl. No. 783,497
[22] Filed Dec. 13, 1968
[45] Patented June 15, 1971
[73] Assignee Fujitsu Limited
Kawasaki, Japan
[32] Priority Dec. 15, 1967
[33] Japan
[31] 42-80496

[54] NONLINEAR ENCODER
8 Claims, 12 Drawing Figs.

[52] U.S. Cl. .......... 325/141, 178/68, 325/38
[51] Int. Cl. .......... H03k 13/02
[50] Field of Search .......... 325/38, 141; 178/68; 179/15 AC, 15 AP; 382/11

[56] References Cited

UNITED STATES PATENTS

| | | | |
|---|---|---|---|
| 3,414,818 | 12/1968 | Reidel .......... | 325/38 |
| 3,447,146 | 5/1969 | Saari .......... | 340/347 |
| 3,460,122 | 8/1969 | Barber .......... | 332/10 |

*Primary Examiner*—Robert L. Griffin
*Assistant Examiner*—Kenneth W. Weinstein
*Attorneys*—Curt M. Avery, Arthur E. Wilfond, Herbert L. Lerner and Daniel J. Tick

ABSTRACT: Each of a plurality of circuit stages has input and output characteristics expressed in terms of a horizontal coordinate axis representing input signals and a vertical coordinate axis representing output signals as a plurality of nonoverlapping continuous straight line segments extending between a minimum level and a maximum level of an output signal. Each of the stages produces code output signals corresponding to the levels of the input signals. The characteristic of one of the stages has a number of nonoverlapping continuous straight line segments greater than those of a succeeding one of the stages.

PATENTED JUN 15 1971 3,585,506

SHEET 03 OF 11

NONLINEAR ENCODER

DESCRIPTION OF THE INVENTION

The present invention relates to a nonlinear encoder. More particularly, the invention relates to an encoder for converting analog to digital signals in a code modulation communication system or in a telemetering system.

An encoder of the type of the present invention is generally required to operate at high speed and at high precision and to be capable of nonlinear quantizing matched to the input signal characteristics.

Convention encoders or coders of the type of the present invention are of the successive feedback comparison type, the pulse coding tube type or the traveling wave type. The successive feedback comparison type encoder is of relatively high precision and performs nonlinear quantizing by switching resistors of a local decoding network in a feedback circuit via an electronic switch. This type of encoder, however, is essentially unsuited for high-speed quantizing, since it is necessary to feed back the input pulse the same number of times as the number of the encoding digits.

A pulse-coding tube-type encoder is best suited for high-speed and nonlinear quantizing, but requires extremely difficult processing by a precision instrument in order to realize high precision. Furthermore, an encoder of such type requires a hot cathode for radiating thermions, since electron beams are utilized in the vacuum tube. A high-voltage power source is required for accelerating electrons. The foregoing disadvantages result in shortening the life of the tube and constitute an important reason for not using such type of encoder.

The traveling wave type encoder is suited for high-speed and high-precision coding and may comprise semiconductor integrated circuits. This type of encoder is stable in operation, of small size, of lightweight, is inexpensive in manufacture and is highly reliable in operation.

In order to minimize quantization noise and increase the dynamic range, nonlinear quantizing has been performed. As far as nonlinear quantizing is concerned, however, such compression and expansion of analog signals that the compression and expansion characteristics may be expressed by a smooth curve in a plane have heretofore been basic. Furthermore, from a rationalistic point of view, smooth compression and expansion characteristics which may be expressed by elementary function, such as logarithmic or hyperbolic functions, which may be readily dealt with, have been examined. Therefore, in performing nonlinear quantizing, the application of signals to a linear encoder after compressing analog signals in an analog compressor utilizing known components, is widely practiced. Furthermore, the approximation of an analytically obtained elementary function is utilized in a nonlinear encoder. A nonlinear encoder is defined as an encoder or coder having a nonlinear function, such as compression and expansion. In a traveling wave type encoder, however, it is difficult to increase the degree of approximation in providing a compression characteristic which approximates an arbitrary function. This is due to the fact that the compression and expansion characteristics which may be realized by a traveling wave type encoder are subjected to a forced condition and become a characteristic having a polygonal line of binomial function when there is binary coding. This defect of the conventional traveling wave type encoder limits the nonlinear quantizing to logarithmic compression and prevents the performance of nonlinear quantizing matched to a characteristic of an arbitrary input signal.

As is evident from the foregoing discussion, none of the conventional encoders satisfies the three necessary conditions of high-speed, high-precision and nonlinear quantizing matched to the characteristic of the input signal.

The principal object of the present invention is to provide a new and improved nonlinear encoder.

An object of the present invention is to provide a nonlinear encoder which overcomes the disadvantages of the known types of nonlinear encoders.

An object of the present invention is to provide a nonlinear encoder which functions at high speed and high precision and provides nonlinear quantizing matched to the characteristic of the input signal.

An object of the present invention is to provide a nonlinear encoder which simultaneously provides high-speed and high-precision operation and nonlinear quantizing matched to the characteristic of the input signal.

An object of the present invention is to provide a nonlinear encoder which functions with efficiency, effectiveness, reliability and precision.

An object of the present invention is to provide a nonlinear encoder which functions as an analog to digital encoder and closely approximates the curve of the required compression characteristic.

An object of the present invention is to provide a nonlinear encoder of simple structure.

In accordance with the present invention, a nonlinear encoder comprises a plurality of circuit stages connected in cascade. Each of the circuit stages has input and output characteristics expressed in terms of a horizontal coordinate axis representing input signals and a vertical coordinate axis representing output signals as a plurality of nonoverlapping continuous straight line segments extending between a minimum level and a maximum level of an output signal. Each of the circuit stages produces code output signals corresponding to the levels of the input signals. The characteristic of one of the circuit stages has a number of nonoverlapping continuous straight line segments and the characteristic of a succeeding one of the circuit stages has a lesser number of nonoverlapping continuous straight line segments. The first of the circuit stages comprises a circuit arrangement for determining the polarity of the input signal. One of the circuit stages comprises a quaternary circuit arrangement and another of the circuit stages succeeding the one of the circuit stages comprises a binary circuit arrangement.

In order that the present invention may be readily carried into effect, it will now be described with reference to the accompanying drawings, wherein:

FIG. 11, which comprises

In the FIGS., the same components are identified by the same reference numerals.

The nonlinear encoder of the present invention is a traveling wave type encoder and comprises a plurality of circuit stages each of which comprises known circuitry. The necessary number of circuit stages is connected in cascade. A pulse amplitude modulated signal or PAM signal, for example, which is to be encoded or coded, is supplied to the first circuit stage and the coding is completed when the signal is provided by the last circuit stage. In the nonlinear encoder of the present invention, the supplied input signal is compared with a determined reference level and the code output signal is provided. The supplied signal is converted into a suitable value by amplification, rectification and biasing, and is transferred from the first circuit stage to the next-succeeding circuit stage.

The input and output characteristics of the circuit stages are expressed in terms of a horizontal coordinate axis representing input signals and a vertical coordinate axis representing output signals as a plurality of nonoverlapping continuous straight line segments extending between a minimum level and a maximum level of the output signals The number of straight line segments is generally determined in accordance with the number *m* of an *m*-nary code. An *m*-nary code is understood to be a multinary code having *m* code units. Thus, for example, in a binary code, there are two straight line segments in the input and output characteristic and in a trinary code, there are three straight line segments in the input and output characteristic. In an *n*-nary code, there are *n* straight line segments in the input and output characteristic. Linear encoding or coding is performed when the absolute values of the slopes of the straight line segments are equal and nonlinear encoding or coding is performed when the absolute values of said slopes are not equal.

Figure 1:
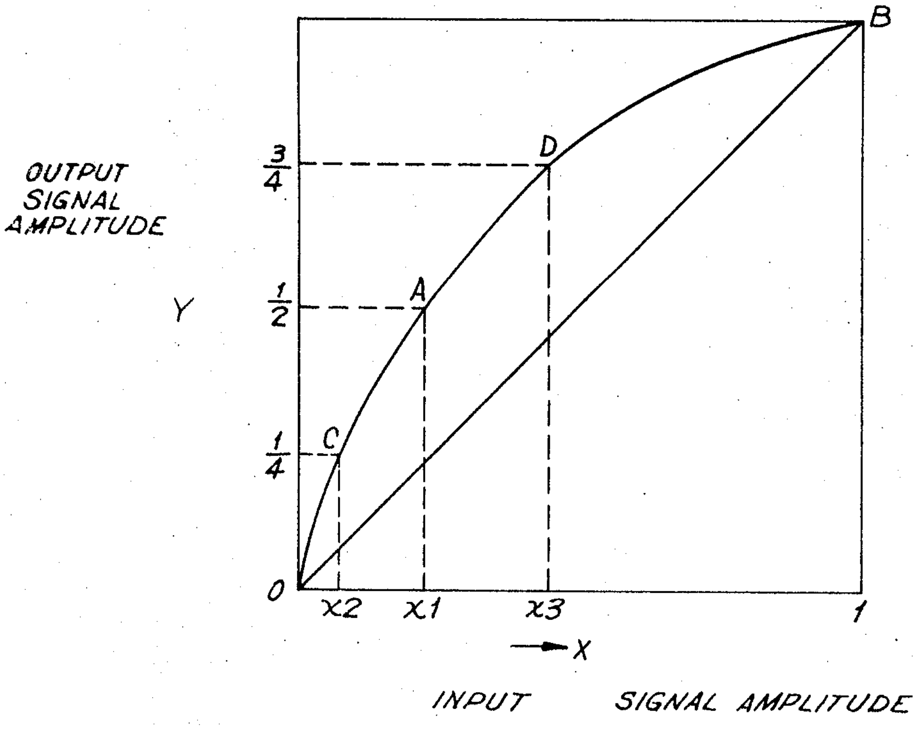
FIG. 1 is a graphical presentation explaining nonlinear coding in a traveling wave type encoder.

In each of FIGS. 1 to 7, the abscissa represents the input signal amplitude and the ordinate represents the output signal amplitude. In FIG. 1, the curve OAB is the compression characteristic. In a conventional traveling wave type nonlinear encoder, in a binary system, when the amplitude of the input signal to be encoded is distributed symmetrically with respect to a line separating the positive and negative regions, the negative amplitude moves over to the positive side, or the positive amplitude moves over to the negative side in the first circuit stage, and the compression is then performed, In this case, the abscissa of FIG. 1 is divided into two parts, one of which extends from 0 to $x1$ and the other of which extends from $x1$ to 1. The digit of the code is determined in accordance with which of the two parts of the abscissa includes the input amplitude.

In FIG. 1, $x1$ is the input amplitude corresponding to the point at which the output amplitude is one-half the maximum amplitude. If the compression characteristic OAB is logarithmic, and if the points $x2$ and $x3$ correspond to the output amplitude points corresponding to one-fourth and three-fourths the maximum amplitude, respectively, $x1$, $x2$ and $x3$ are related to each other as follows:

$$\frac{x2}{x1-x2}=\frac{x3-x1}{1-x3}=\frac{x1}{1-x1} \qquad (1)$$

If suitable amplification is provided so that $x1$ and $1-x$ may become 1, it is possible to process $x1$ and $1-x1$ in a single circuit stage, comprising the second circuit stage of the encoder, to determine the second digit. If the compression characteristic OAB is not logarithmic, however, the second indication of equality of equation (1) cannot be satisfied. If the first indication of equality is satisfied, however, encoding or coding may be performed by a traveling 0type encoder, but the points C and D are not always on the curve OAB. That is, a binary traveling wave type encoder is able to realize only nonlinear quantizing having a special compression characteristic.

Figure 2:
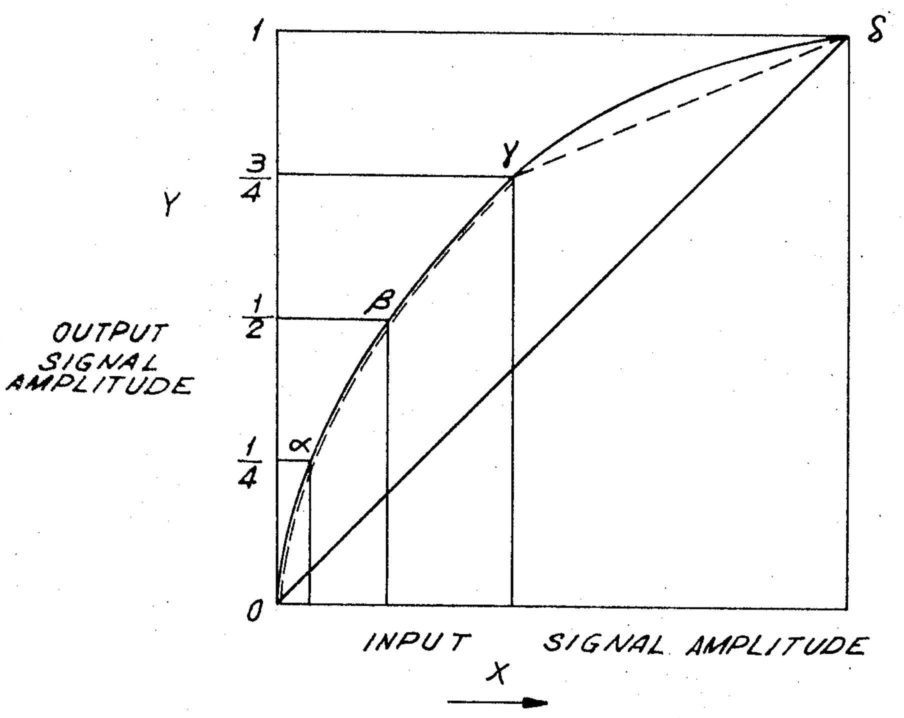
FIG. 2 is a graphical presentation explaining compression encoding in a multinary system.

The compression characteristic is divided into *n* parts by the first circuit stage in a multinary, indicated as an *n*-nary, system instead of a binary system. The *n*-divided compression characteristic is shown in FIG. 2. In FIG. 2, the compression characteristic is divided into four parts. Each of the arcs $0\alpha$, $\alpha\beta$, $\beta\gamma$ and $\gamma\delta$ is almost a straight line segment and may be so coded. The part of the abscissa or input signal amplitude corresponding to the part of the ordinate or output signal amplitude 0 to ¼ is proportional to the part of the input signal amplitude which corresponds to the parts of the output signal amplitude indicated by ¼ to ½, ½ to ¾ and ¾ to 1, so that binary nonlinear type coding may be performed by a traveling wave type encoder In the present disclosure, *n* utilized in the first stage is identified as $n1$, *n* utilized in the second stage is $n2$, *n* utilized in the third stage is $n3$, and so on. In the encoder of the present invention, $n1$ is not large and equals, for example, 3 or 4. In the encoder of the present invention, $n2$ is not larger than $n1$. The relationship of $n1$ and $n2$ is expressed as $$2 \leqq n2 \leqq n1 \qquad (2)$$

Digit determination of the $n2$-nary system is performed in accordance with equation (2). In this case, as hereinbefore described, the points C, A, and D of FIG. 1 are not always on the compression characteristic curve. These points are determined so that the quantization noise is a minimum. In the same manner, $n3$ is utilized in the digit determining circuit of the third circuit stage. The relationship between $n2$ and $n3$ is $$2 \leqq n3 \leqq n2 \qquad (3)$$

Thus, in performing quantization in a traveling wave type encoder, the first circuit stage is an $n1$-nary system, the second circuit stage is an $n2$-nary system, the third circuit stage is an $n3$-nary system, the mth circuit stage is an $nm$-nary system except for the first sign, and the circuit stages are divided so that the quantization noise approaches the minimum level. The relationship between $n1$, $n2$, $n3$ . . . $nm$ is $$n1 \geqq n2 \geqq n3 \geqq \ . \ . \ . \ \geqq nm \geqq 2 \qquad (4)$$

None of the equalities of equation (4) can be satisfied. Actually, the values of $n1$, $n2$, $n3$ . . . $nm$ are determined by the compression characteristic. When the curve OAB of FIG. 1 is close to the straight line OB in said figure, the value of $n1$ may be small. When the curve OAB of FIG. 1 is spaced from the straight line OB of said figure, the value of $n1$ is large.

As hereinbefore described, the present invention provides a traveling wave type encoder which approximates the curve of the required compression characteristic more closely than known types of encoders. This is accomplished by a circuit arrangement of simple structure by providing a number *m* which is not uniform, but is varied, and furthermore making said number in one of the circuit stages larger than or equal to the number of the next-succeeding circuit stage. The number *m* is the number of code elements of the *m*-nary system in the circuit stages, that is, the number of straight line segments in the input and output characteristics of said circuit stages.

Table I discloses the various types of compression characteristics to be realized, functions of such characteristics, and the ratio quantization step. The effects of the nonlinear encoder of the present invention are illustrated with respect to table I and FIGS. 3 to 7. FIGS. 3 to 7 illustrate the functions listed in Table I and illustrate various types of approximate characteristics.

TABLE I

| Compression characteristics to be realized | Compression characteristic y=F (x) | Ratio quantization step Δ (x) | Note | Fig. |
|---|---|---|---|---|
| Second function | $(1-A)x+Ax^2$ | $(1-A)+2Ax$ | A=0.952 | 3 |
| Third function | $(1-A)x+Ax^3$ | $(1-A)+3Ax^2$ | A=0.952 | 4 |
| Hyperbolic sine function | $\frac{\sinh (bx)}{\sinh b}$ | $\frac{b \cosh (bx)}{\sinh b}$ | b=5.43 | 5 |
| Hyperbolic function | $\frac{x}{1+h(1-x)}$ | $\frac{1+h}{[1+h(1-x)]^2}$ | h=20 | 6 |
| Composite hyperbolic function | $\frac{x}{1+m(1-x^2)}$ | $\frac{1+m(1+x^2)}{[1+m(1-x^2)]^2}$ | m=20 | 7 |

Figure 3:
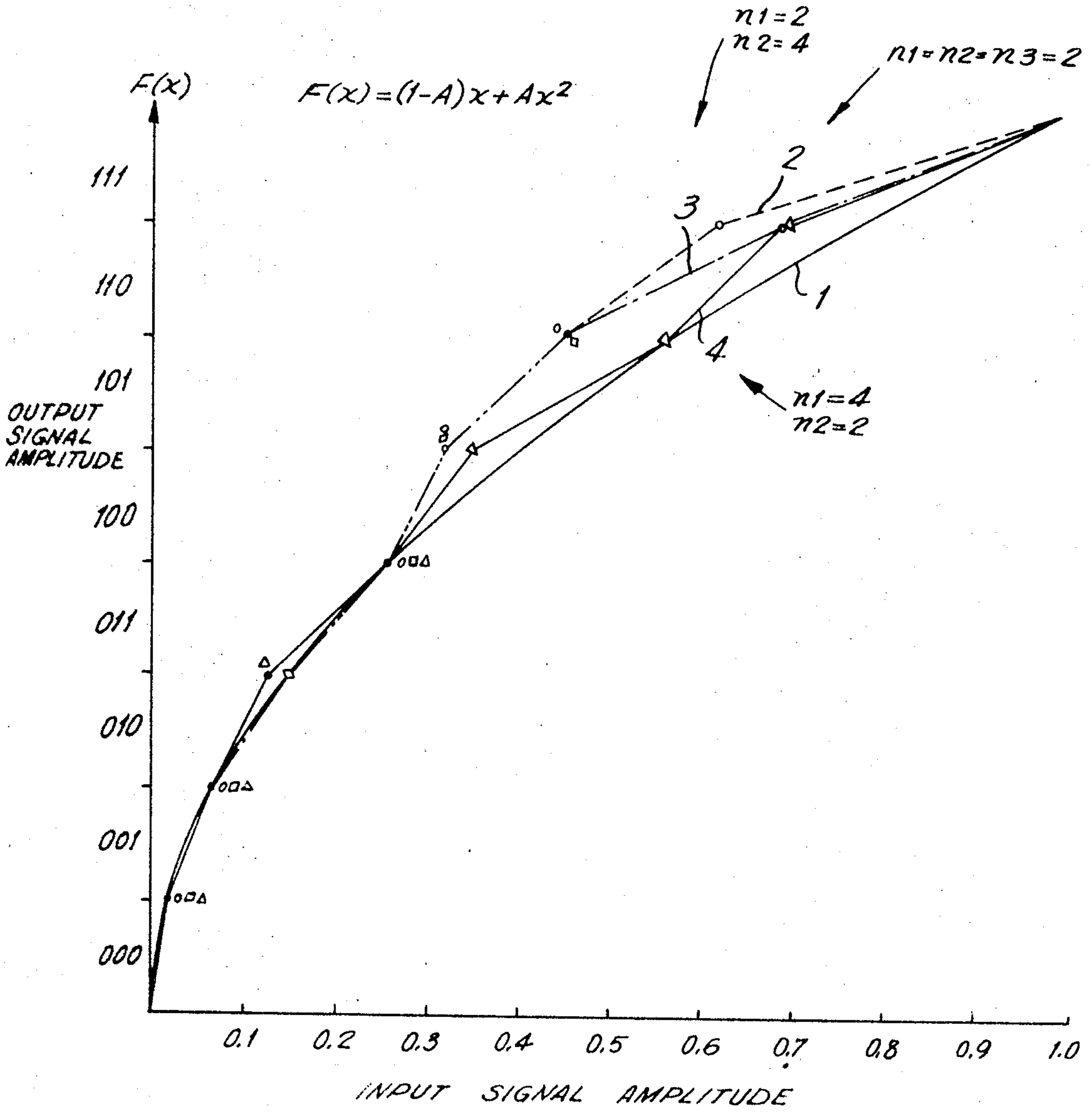
FIGS. 3, 4, 5, 6 and 7 are graphical presentations illustrating the effect of the nonlinear encoder of the present invention.

FIG. 3 discloses a curve of the second function listed in Table I. The second function is $F(x)=(1-A)x+Ax^2$, and is indicated by the curve 1 of FIG. 3. The curve 2 of FIG. 3 is a plurality of line segments approximating the curve 1 when $n1=2$, $n2=2$, and $n3=2$. The curve 3 of FIG. 3 is a plurality of line segments approximating the curve 1 when $n1=2$ and $n2=4$. The curve 4 of FIG. 3 is a plurality of line segments approximating the curve 1 when $n1=4$ and $n2=2$. In FIG. 3, the abscissa represents the input signal amplitude and the ordinate represents the output signal amplitude.

Figure 4:
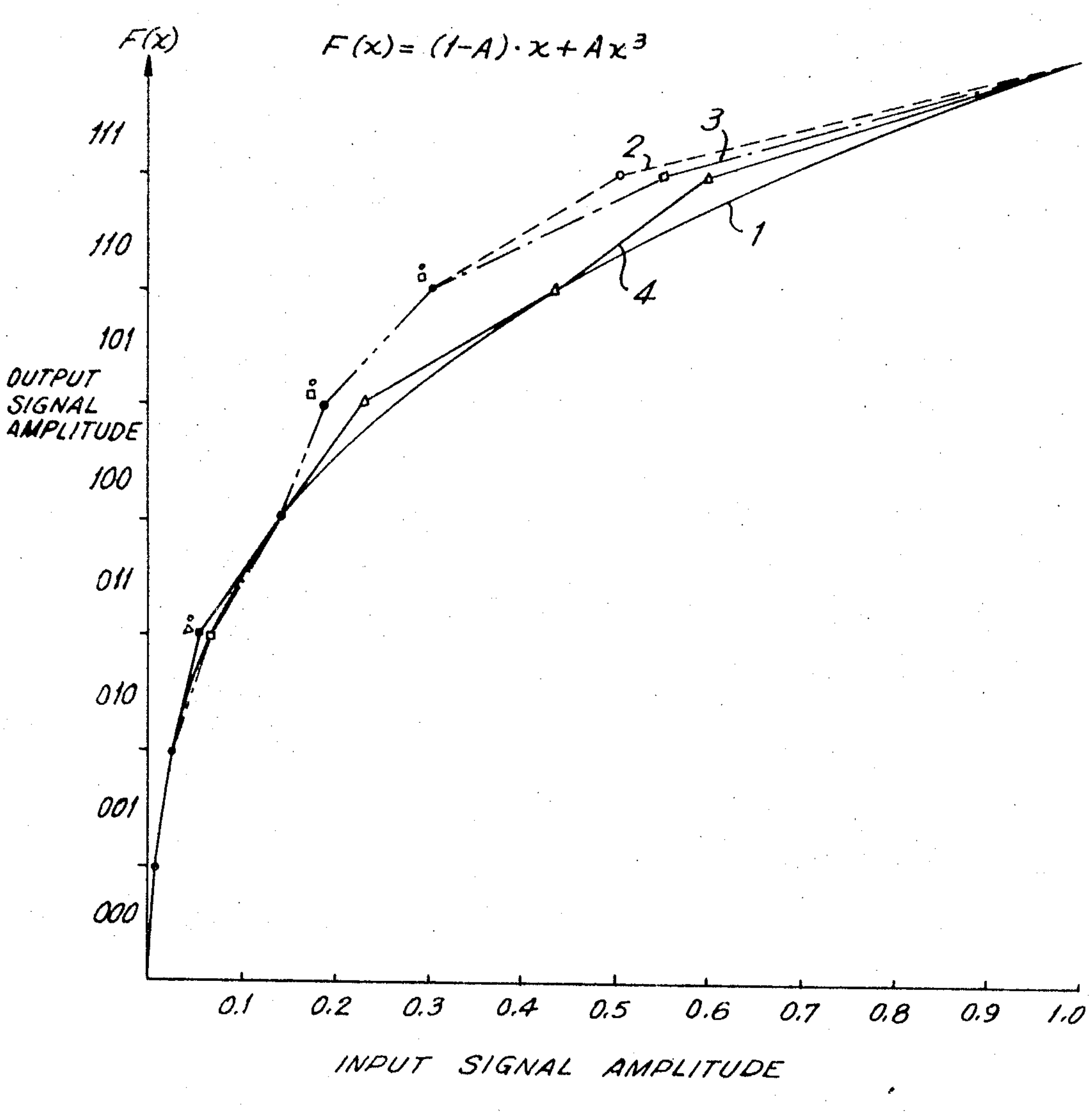
Figure 5:
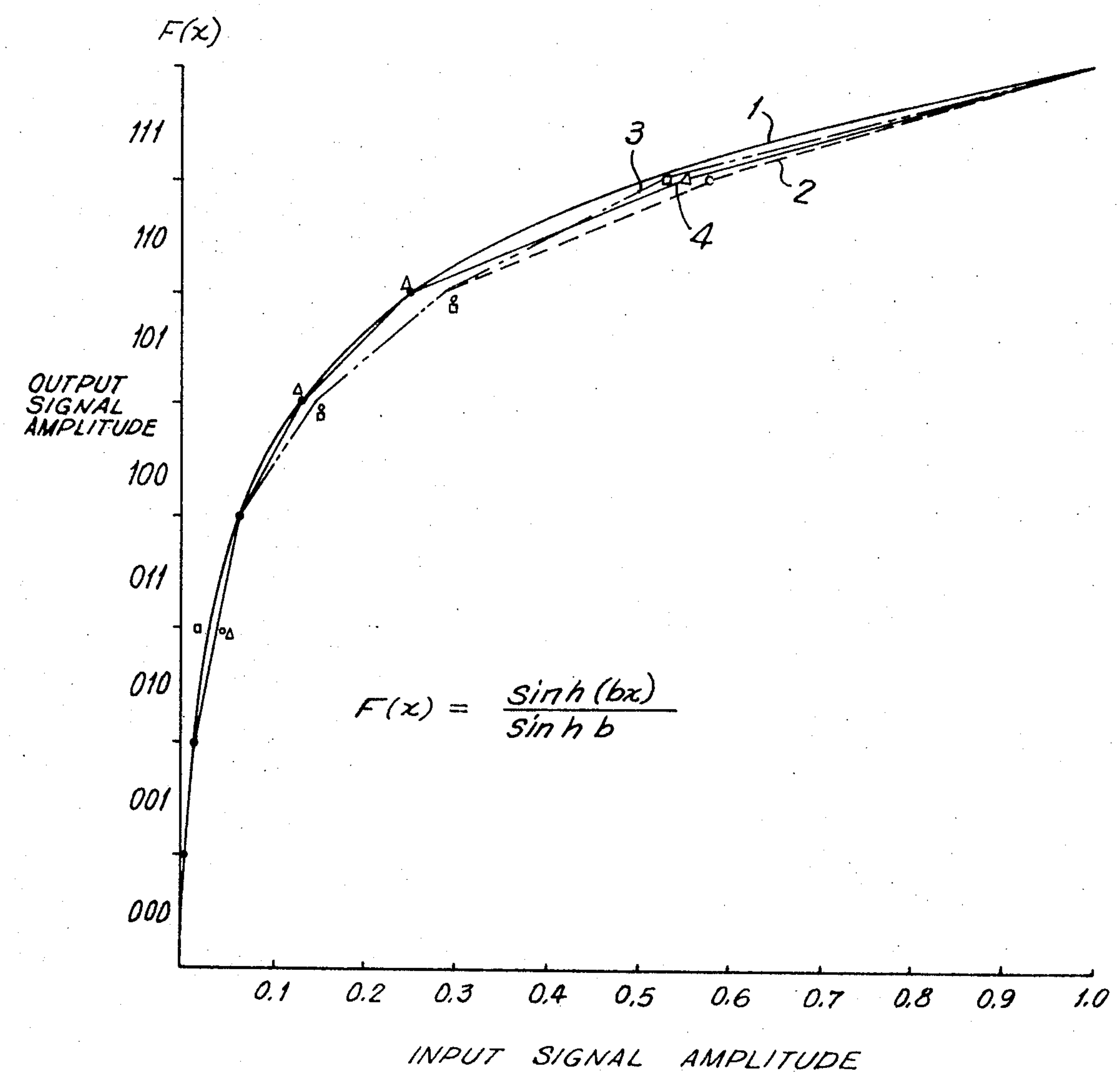
Figure 6:
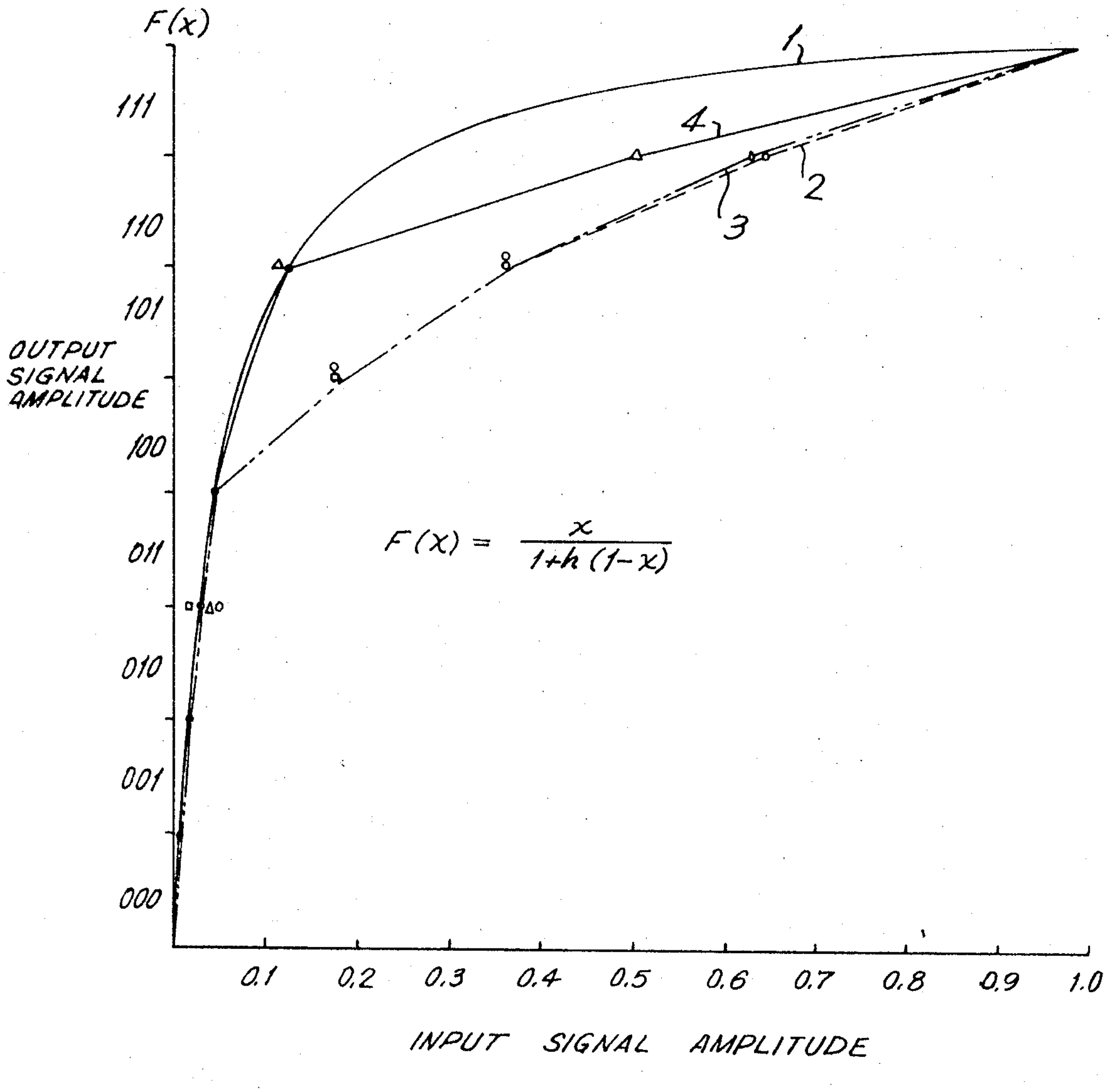
Figure 7:
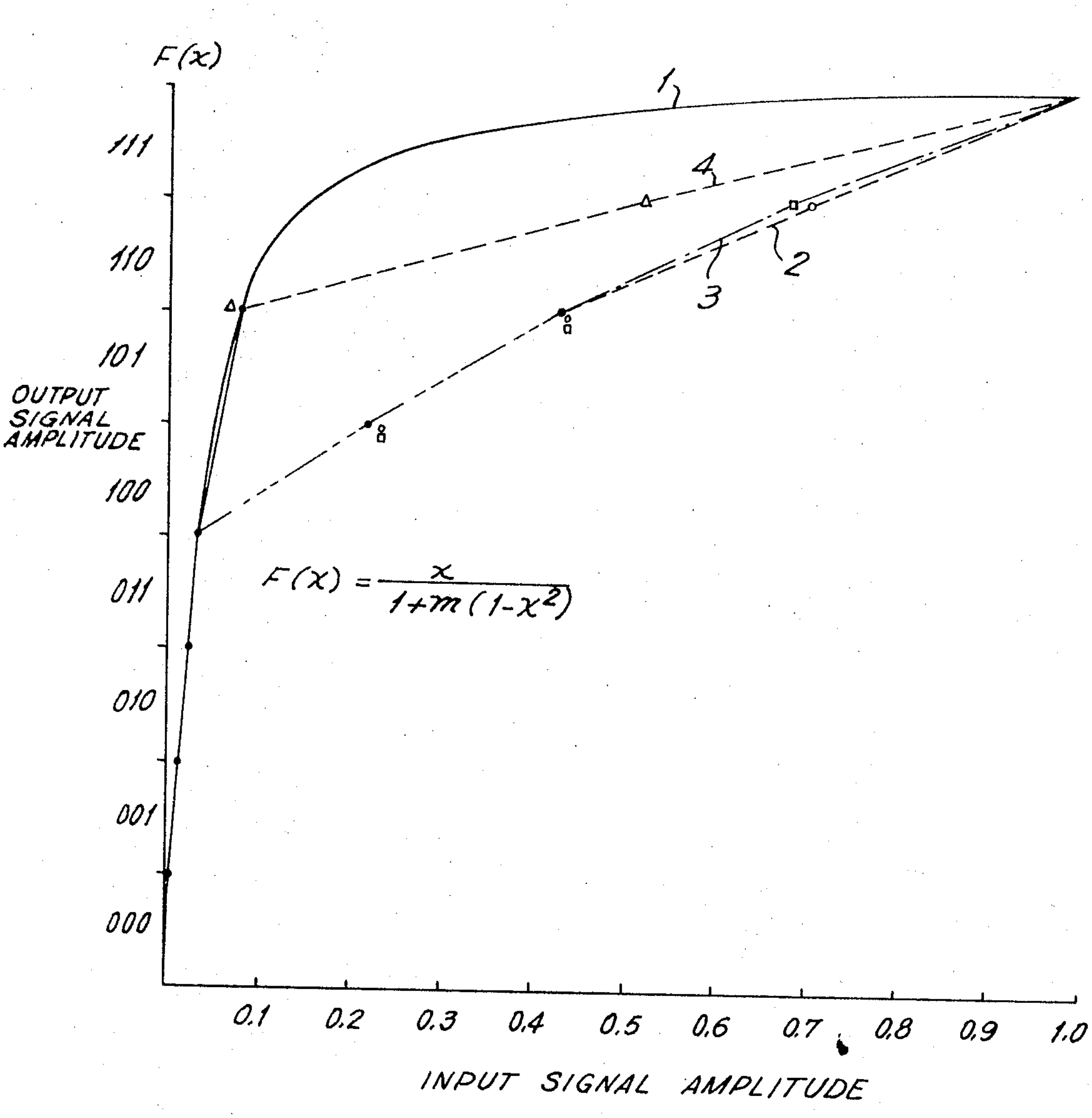

FIG. 4 is a graphical presentation of the third function $F(x)=(1-A)x+Ax^3$, as shown in curve 1 thereof, and as indicated in Table I. FIG. 5 is a graphical presentation of the hyperbolic sine function [sinh $(bx)$] sinh $b$, as indicated in Table I. Curve 1 of FIG. 5 illustrates the hyperbolic sine function. FIG. 6 illustrates the hyperbolic function $x/[1+h(1-x)]$, as illustrated in Table I. In FIG. 6, the curve 1 is the hyperbolic function. FIG. 7 is a graphic presentation of the composite hyperbolic function $x/[1+m(1-x^2)]$, as shown in Table I. In FIG. 7, the curve 1 represents the composite hyperbolic function.

In each of FIGS. 4, 5, 6 and 7, as in FIG. 3, the curve 2 is a plurality of straight line segments approximating the curve 1 when $n1=2$, $n2=2$ and $n3=2$. The curve 3 of each of FIGS. 4, 5, 6 and 7 is a plurality of straight line segments approximating the curve 1 when $n1=2$ and $n2=4$. In each of FIGS. 4, 5, 6 and 7, as in FIG. 3, the curve 4 is a plurality of continuous straight line segments approximating the curve 1 when $n1=4$ and $n2=2$. As is evident from FIGS. 3 to 7, the plurality of continuous straight line segments of curve 4 of each of said figures most closely approximates the compression characteristic curve 1, so that such approximation is closest when $n1=4$ and $n2=2$.

In the present invention, codes obtained in the aforedescribed manner are complicated, since $n1$, $n2$, $n3$ . . . $nm$ are not necessarily equal. These codes are transmitted in a suitable manner for transmission and are decoded in the receiver. It is also possible to convert such codes into binary codes. In a more convenient method, $n1$, $n2$, $n3$ . . . $nm$ may be given values which are integral powers of 2, such as $n1=4$, $n2=4$, $n3=2$ . . .. In accordance with such method, although the codes are formally multinary codes, they are substantially binary codes.

Figure 8:
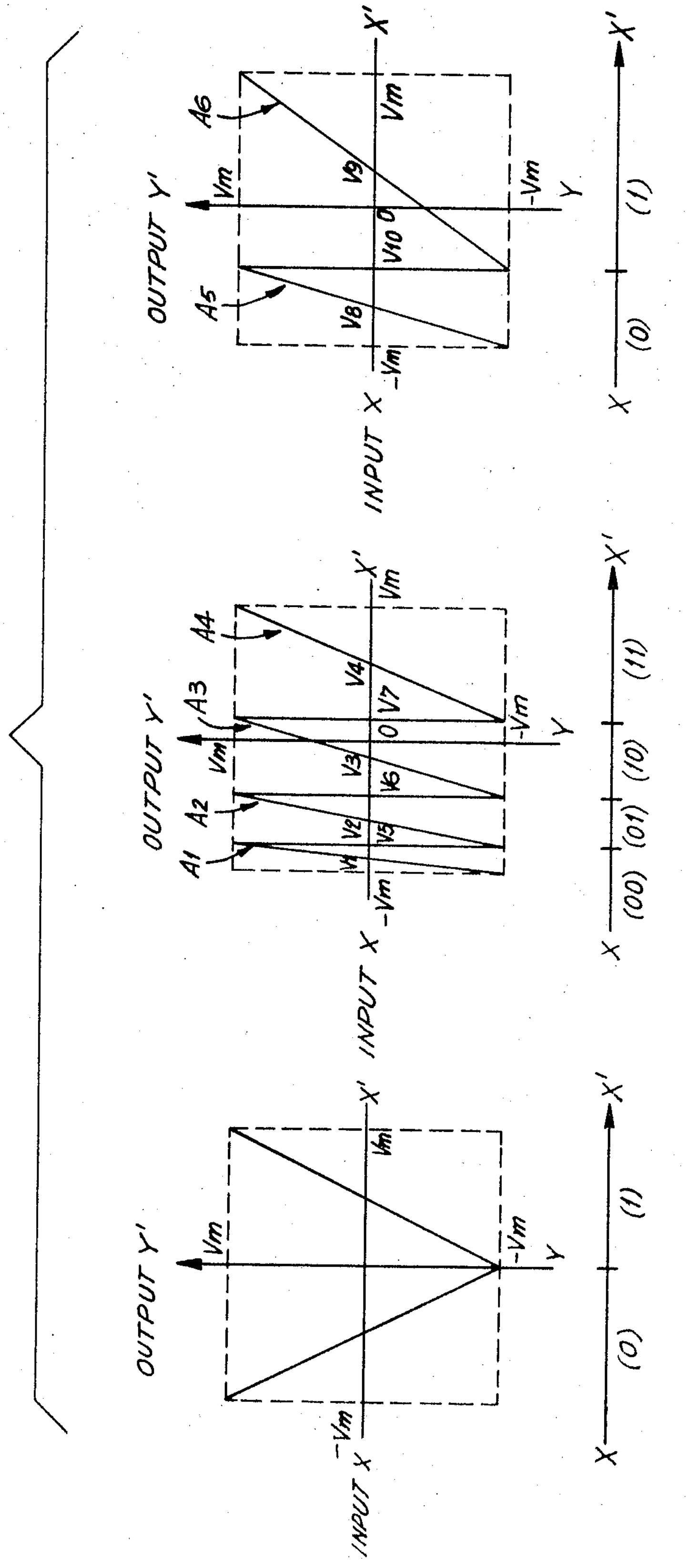
FIG. 8 is a graphical presentation of the input and output characteristics of the circuit stages of an embodiment of the nonlinear encoder of the present invention.
Figure 9:
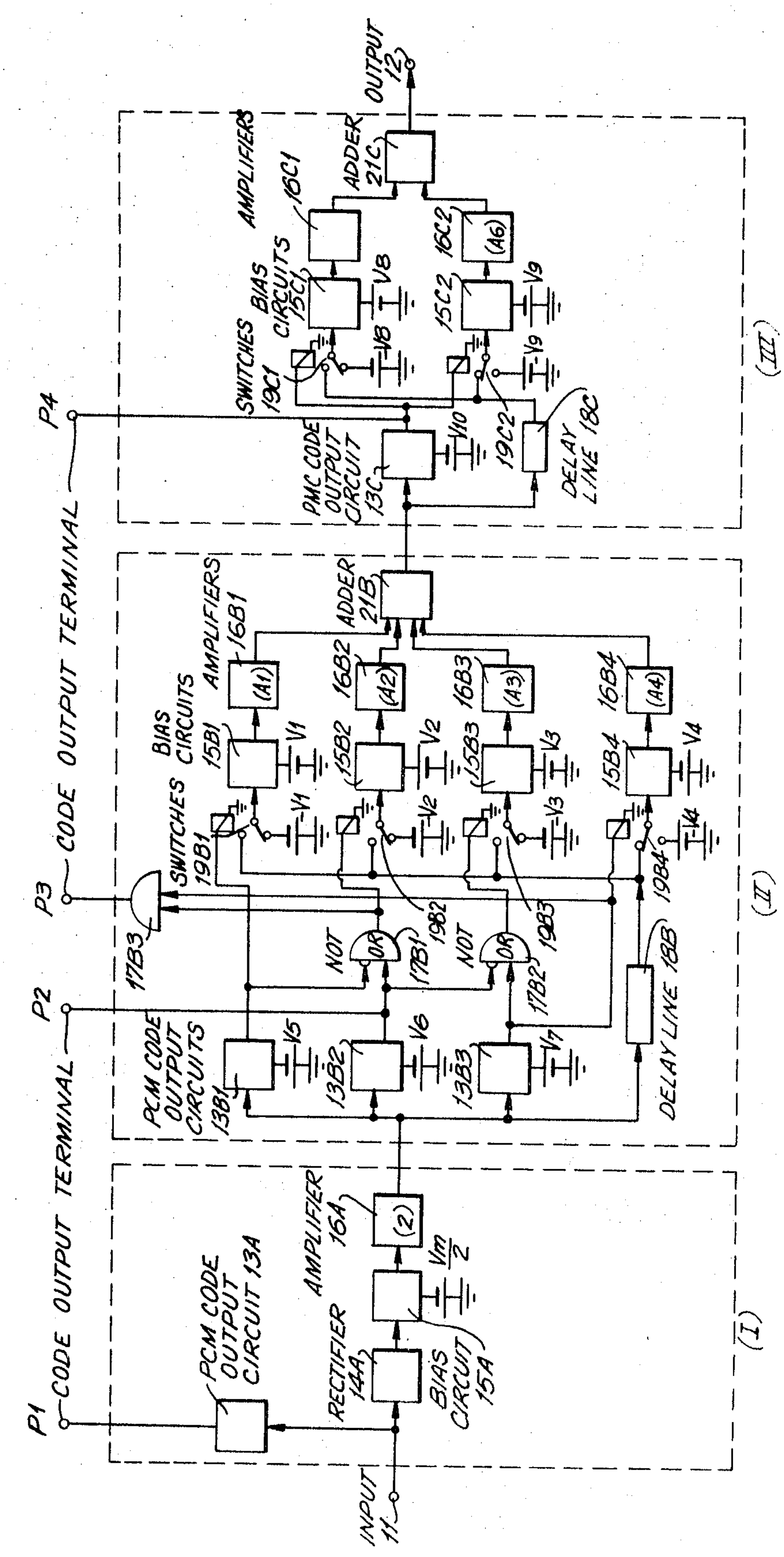
FIG. 9 is a block diagram of an embodiment of the nonlinear encoder of the present invention.

FIG. 8 discloses the input and output characteristics of the circuit stages of the nonlinear encoder of the present invention for quaternary binary nonlinear encoding FIG. 9 is a block diagram of the nonlinear encoder of the present invention. In the embodiment of FIGS. 8 and 9, the input signals are compressed symmetrically with respect to a line separating the positive and negative regions, and nonlinear encoding or coding is performed. For this reason, the first circuit stage, indicated by I, comprises circuitry for determining the sign or polarity of the input signal. The second and third stages, indicated by II and III, respectively, comprise nonlinear coding stages. Of course, in some cases, the first circuit stage of the aforedescribed type may be eliminated.

The three diagrams of FIG. 8 disclose the input and output characteristics of the first, second and third circuit stages of the nonlinear encoder. Each of the three diagrams is provided with a straight line XX' beneath it which indicates the code output of the circuit stage to which it pertains. In FIG. 8, the first circuit stage I functions to compress the input signals symmetrically with respect to a line separating the positive and negative regions. The first circuit stage is equivalent to known circuitry utilized in linear alternating binary coding.

The second circuit stage II comprises known circuitry for nonlinear quaternary coding and is represented by four continuous straight line segments A1, A2, A3 and A4, each of said line segments having a different slope. The third circuit stage III comprises known circuitry for nonlinear binary coding and is represented by two continuous straight line segments A5 and A6. Each of the straight line segments A5 and A6 has a slope different from the other. The line XX' beneath the second diagram of FIG. 8 illustrates a quaternary code 00, 01, 10 and 11, which is provided as the code output of the second circuit stage. This illustrates that quaternary codes are transmitted by the combination of binary codes and they may also be transmitted by other quaternary codes.

In FIG. 9, the first, second and third circuit stages correspond to those of FIG. 8 and are indicated by I, II and III, respectively. Although only three circuit stages are illustrated in FIG. 9, in actuality, any suitable number of such circuit stages may be connected in cascade. The input signal is provided via an input terminal 12. Any succeeding circuit stages may be connected to the output terminal 12 of the third circuit stage III. The code outputs are provided at code output terminal P1 of the first circuit stage, code output terminals P2 and P3 of the second circuit stage and code output terminal P4 of the third circuit stage.

In the first circuit stage, a PCM code output circuit 13A is connected between the input terminal 11 and the code output terminal P1. A rectifier 14A has an input connected to the input terminal 11. A bias circuit 15A is connected to the output of the rectifier 14A. The bias circuit 15A is connected to a source of DC voltage or battery which provides a voltage V$m$/2. An amplifier 16A is connected between the bias circuit 15A and the input to the second circuit stage. The PCM code output circuit 13A comprises a comparator and a pulse shaping circuit. The amplifier 16A amplifies a signal supplied thereto two times.

The second circuit stage comprises a plurality of PCM code output circuits 13B1, 13B2 and 13B3 connected in common to the output of the amplifier 16A of the first circuit stage. The outputs of the PCM code output circuits 13B1 and 13B2 are connected to the inputs of a first OR gate 17B1. The output of the circuit 13B1 is connected to the corresponding input of the OR gate 17B1 via a NOT circuit. The code output terminal P2 is connected to the output of the circuit 13B2.

The outputs of the PCM code output circuits 13B2 and 13B3 are connected to the inputs of an OR gate 17B2. The output of the circuit 13B2 is connected to the corresponding input of the OR gate 17B2 via a NOT circuit. The output of the PCM code output circuit 13B3 and the output of the OR gate 17B1 are connected to the inputs of an OR gate 17B3. The code output terminal P3 is connected to the output of the OR gate 17B3.

The output of the amplifier 16A of the first circuit stage is also connected to the input of a delay line 18B. A switch 19B1 has a switch arm which is controlled in movement by the PCM code output circuit 13B1. The switch arm of the switch 19B1 in the position shown in FIG. 9 is in electrical contact at its free end with a DC voltage source or battery which provides a voltage V1. In its position opposite to that shown in FIG. 9, the switch arm of the switch 19B1 is electrically connected at its free end to the output of the delay line 18B.

A switch 19B2 has a switch arm which is controlled in movement by the OR gate 17B1. In its position shown in FIG. 9, the switch arm of the switch 19B2 is electrically connected at its free end to a DC voltage source or battery which provides a voltage V2. In its position opposite that shown in FIG. 9, the switch arm makes electrical contact at its free end with the output of the delay line 18B.

A switch 19B3 has a switch arm which is controlled in movement by the OR gate 17B2. In its position shown in FIG. 9, the switch arm of the switch 19B3 is electrically connected at its free end to a DC voltage source or battery which provides a voltage V3. In its position opposite that shown in FIG. 9, the switch arm makes electrical contact at its free end with the output of the delay line 18B.

A switch 19B4 has a switch arm which is controlled in movement by the PCM code output circuit 13B3. In its position shown iq FIG. 9, the switch arm of the switch 19B4 makes electrical contact at its free end with the output of the delay line 18B. In its position opposite that shown in FIG. 9, the switch arm of the switch 19B4 makes electrical contact at its free end with a DC voltage source or battery which provides a voltage V4.

The PCM code output circuit 13B1 is connected to a source of DC voltage or battery which provides a voltage V5. The PCM code output circuit 13B2 is connected to a source of DC voltage or battery which provides a voltage V6. The PCM code output circuit 13B3 is connected to a source of DC voltage or battery which provides a voltage V7.

A bias circuit 15B1 has an input connected to the fixed end of the switch arm of the switch 19B1 and an output connected to the input of an amplifier 16B1. The bias circuit 15B1 is connected to a DC voltage source or battery which provides a voltage V1. A bias circuit 15B2 has an input connected to the fixed end of the switch arm of the switch 19B2 and an output connected to the input of an amplifier 16B2. The bias circuit 15B2 is connected to a DC voltage source or battery which provides a voltage V2.

A bias circuit 15B3 has an input connected to the fixed end of the switch arm of the switch 19B3 and an output connected to the input of an amplifier 16B3. The bias circuit 15B3 is connected to a DC voltage source or battery which provides a voltage V3. A bias circuit 15B4 has an input connected to the fixed end of the switch arm of the switch 19B4 and an output connected to the input of an amplifier 16B4. The bias circuit 15B4 is connected to a DC voltage source or battery which provides a voltage V4.

The amplifier 16B1 provides an amplification A1. The amplifier 16B2 provides an amplification A2. The amplifier 16B3 provides an amplification A3. The amplifier 16B4 provides an amplification A4. The outputs of the amplifiers 16B1, 16B2, 16B3 and 16B4 are connected in common to the inputs of an adder 21B. The output of the adder 21B is connected to the input of the third circuit stage.

The output of the adder 21B is connected to the input of a PCM code output circuit 13C and to the input of a delay line 18C. The PCM code output circuit 13C is connected to a DC voltage source or battery which provides a voltage V10. The code output terminal P4 is connected to the output of the PCM code output circuit 13C.

A switch 19C1 has a switch arm which is controlled in movement by the PCM code output circuit 13C. In its position shown in FIG. 9, the switch arm of the switch 19C1 is in electrical contact at its free end with a DC voltage source or battery which provides a voltage V8. In its position opposite that shown in FIG. 9, the switch arm of the switch 19C1 is in electrical contact at its free end with the output of the delay line 18C. A switch 19C2 has a switch arm which is controlled in its movement by the PCM code output circuit 13C. In its position shown in FIG. 9, the switch arm of the switch 19C2 is in electrical contact at its free end with the output of the delay line 18C. In its position opposite that shown in FIG. 9, the switch arm of the switch 19C2 is in electrical contact with a source of DC voltage or battery which provides a voltage V9.

A bias circuit 15C1 has an input connected to the fixed end of the switch arm of the switch 19C1 and an output connected to the input of an amplifier 16C1. The bias circuit 15C1 is connected to a DC voltage source or battery which provides a voltage V8. A bias circuit 15C2 has an input connected to the fixed end of the switch arm of the switch 19C2 and an output connected to the input of an amplifier 16C2. The bias circuit 15C2 is connected to a DC voltage source or battery which provides a voltage V9.

The amplifier 16C1 provides an amplification A5 and the amplifier 16C2 provides an amplification A6. The outputs of the amplifiers 16C1 and 16C2 are connected in common to the inputs of an adder 21C. The output of the adder 21C is connected to the output terminal 12 of the encoder. Each of the delay lines 18B and 18C is an analog delay line. The amplification provided by each of the amplifiers 16B1, 16B2, 16B3, 16B4, 16C1 and 16C2, which is A1, A2, A3, A4, A5 and A6, respectively, corresponds to the slopes of the lines A1, A2, A3, A4, A5 and A6, respectively, of FIG. 8.

The sign or polarity of the PAM input pulse supplied to the input terminal 11 is determined by the PCM code output circuit 13A of the first circuit stage. The PCM code output circuit 13A produces a code output pulse corresponding to 0 or 1 at the code output terminal P1. The phase of the PAM input pulse is inverted by the rectifier 14A and a bias of $vm/2$ volts is added to said pulse by the bias circuit 15A. The pulse is then doubled in amplitude by the amplifier 16A and is supplied to the second circuit stage. The rectifier 14A, the bias circuit 15A and the amplifier 16A cooperate, in the aforedescribed manner, to provide voltage conversion of the input and output characteristics, as shown in the first diagram of FIG. 8.

The converted analog pulse is supplied from the amplifier 16A to the second circuit stage II. The second circuit stage comprises four circuit branches each having a bias circuit and an amplifier connected in series with each other. Thus, the bias circuit 15B1 is connected in series circuit arrangement with the amplifier 16B1, which amplifier provides an amplification A1, and so on. The amplification provided by each of the amplifiers 16B1, 16B2, 16B3 and 16B4 corresponds to the slope of the straight line segments A1, A2, A3 and A4, respectively, in four intervals, as shown in the second diagram of FIG. 8.

The slope of the line segment A1 is provided at a voltage less than V5. The slope of the line segment A2 is provided at a voltage between V5 and V6. The slope of the line segment A3 is provided at a voltage between V6 and V7. The slope of the line segment A4 is provided at a voltage greater than V7. Each of the series circuit arrangements is connected into the circuit by a corresponding one of the switches 19B1, 19B2, 19B3 and 19B4, under the control of the PCM code output circuit 13B1, the OR gate 17B1, the OR gate 17B2 and the PCM code output circuit 13B3, respectively.

When terminal switches 19B1, 19B2, 19B3 and 19B4 are in their positions shown in FIG. 9, the bias circuits 15B1, 15B2 and 15B3 provide no output signal and the bias circuit 15B4 provides an output signal. When the switches 19B1, 19B2, 19B3 and 19B4 are in their positions opposite those shown 2-bit FIG. 9, the bias circuits 15B1, 15B2 and 15B3 provide output signals and the bias circuit 15B4 provides no output signal. When the switch 19B1 is connected in its position opposite that shown in FIG. 9, the input signal supplied to the second circuit stage is supplied to the bias circuit 15B1 via the analog delay line 18B. The bias circuit 15B1 converts the input signal into a voltage which will become zero when the input voltage is V1, and such voltage is amplified A1 times by the amplifier 16B1 and is supplied to the adder 21B.

When the switch 19B2 is in its position opposite that shown in FIG. 9, a similar operation will occur, with the input voltage being biased to V2 and amplified A2 times. A similar operation also occurs when the switch 19B3 is in its position opposite that shown in FIG. 9, with the input voltage being biased to V3 and amplified A3 times. When the switch 19B4 is in its position shown in FIG. 9, the input voltage is biased to V4 and is amplified A4 times. The input and output characteristic of the second diagram of FIG. 8 may thus be provided if only one of the four series circuit arrangements is connected in the circuit.

When the input signal is less than V5, the outputs of the PCM code output circuits 13B1, 13B2 and 13B3 are zero, so that the switches 19B1 and 19B4 are moved to their positions opposite those shown in FIG. 9, and the switches 19B2 and 19B3 are maintained in their positions shown in FIG. 9. Consequently, the input signal to the second circuit stage passes only through the bias circuit 15B1 and the amplifier 16B1, so that the input and output characteristic of the first interval of the second diagram of FIG. 8 is provided.

When the input signal to the second circuit stage is between V5 and V6, the PCM code output circuit 13B1 produces an output signal of 1 and the outputs of the PCM code output circuits 13B2 and 13B3 are 0, so that the switches 19B2 and 19B4 are moved to their positions opposite those shown in FIG. 9, and the switches 19B1 and 19B3 are maintained in their positions shown in FIG. 9. Consequently, the input signal to the second circuit stage is transferred only via the bias circuit 15B2 and the amplifier 16B2, so that the input and output characteristic of the second interval of the second diagram of FIG. 8 is provided.

When the input signal to the second circuit stage is between V6 and V7, each of the PCM code output circuits 13B1 and 13B2 produces an output signal of 1 and the PCM code output circuit 13B3 produces an output signal of 0, so that the switches 19B3 and 19B4 are switched to their positions opposite those shown in FIG. 9, and the switches 19B1 and 19B2 are maintained in their positions shown in FIG. 9. Consequently, the input signal to the second circuit stage is transferred only via the bias circuit 15B3 and the amplifier 16B3, so that the input and output characteristic of the third interval of the second diagram of FIG. 8 is provided.

When the input signal is greater than V7, the output signal of each of the PCM code output circuits 13B1, 13B2 and 13B3 is 1, so that each of the switches 19B1, 19B2, 19B3 and 19B4 is maintained in its position shown in FIG. 9. Consequently, the input signal is transferred only via the bias circuit 15B4 and the amplifier 16B4, so that the input and output characteristic of the fourth interval of the second diagram of FIG. 8 is provided.

As hereinbefore described, the input signals of all the voltage ranges are suitably converted and are added in the adder 21B of the second circuit stage. The resultant sum of the signals is supplied from the adder 21B to the input of the third circuit stage. The output of the PCM output circuit 13B2 of the second circuit stage is provided as a code output at the code output terminal P2. The output of the OR gate 17B3 is provided as a code output at the code output terminal P3. In the illustrated embodiment of the present invention, the code output of the second circuit stage is indicated as two bits. It is, however, possible to logically convert the 2-bit signal into one bit of quaternary code.

The third circuit stage provides code conversion as indicated in the third diagram of FIG. 8. The third circuit stage performs nonlinear binary coding and functions in almost the same manner as does the second circuit stage. The input signal supplied to the third circuit stage is supplied in common to the PCM code output circuit 13C and the analog delay line 18C. When the input signal to the third circuit stage is greater than V10, the PCM code output circuit 13C produces an output signal of 1 and when said input signal is less than V10, said PCM code output circuit produces an output signal of 0.

When the PCM code output circuit 13C produces an output signal of 1, the switches 19C1 and 19C2 are maintained in their positions shown in FIG. 9, and the bias voltage V9 is added by the bias circuit 15C2 to the input signal transferred via the delay line 18C. After the bias signal is amplified A6 times by the amplifier 16C2, it is transferred to the adder 21C. At such time, the output of the bias circuit 15C1 is 0.

When the PCM code output circuit 13C produces an output signal of 0, the switches 19C1 and 19C2 are moved to their positions opposite those shown in FIG. 9, and the bias voltage V8 is added by the bias circuit 15C1 to the input signal transferred via the delay line 18C. After the bias signal is amplified A5 times by the amplifier 16C1, it is transferred to the adder 21C. At such time, the output of the bias circuit 15C2 is 0. During the foregoing operation, the output of the PCM code output circuit 13C is supplied to the code output terminal P4 as the code output. Thus, nonlinear encoding or coding may be performed by a traveling wave type encoder. In the aforedescribed nonlinear encoder, the analog delay lines 18B and 18C compensate for delays in operating time of the PCM code output circuits and of the switches.

Figure 10:
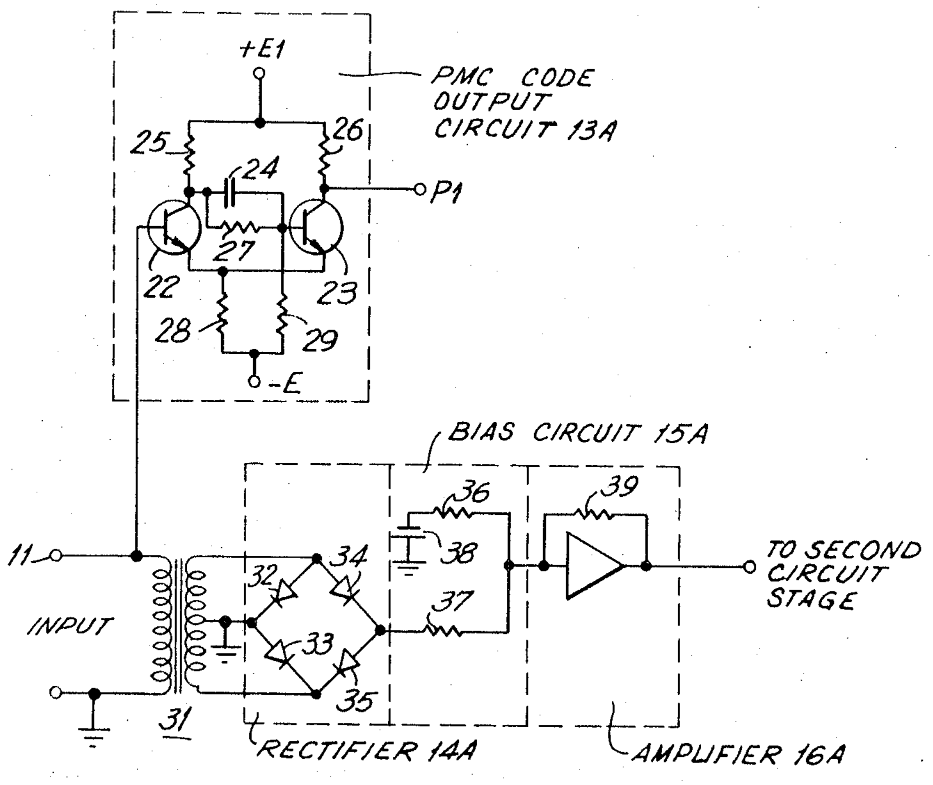
FIG. 10 is a circuit diagram of an embodiment of the first circuit stage of the nonlinear encoder of FIG. 9.

FIG. 10 is a circuit diagram of an embodiment of the first circuit stage in the nonlinear encoder of FIG. 9. In FIG. 10, the PCM code output circuit 13A comprises a pair of transistors 21 and 23, a capacitor 24 and a plurality of resistors 25, 26, 27, 28 and 29, connected to each other to form a well-known Schmitt trigger circuit. The input terminal 11 is coupled to the rectifier 14A via a transformer 31. The rectifier 14A comprises a full-wave rectifier having a plurality of diode rectifier elements 32, 33, 34 and 35. The bias circuit 15A comprises a pair of resistors 36 and 37 and a source of DC voltage 38. The amplifier 16A comprises an amplifier having a feedback 39.

Figure 11A:
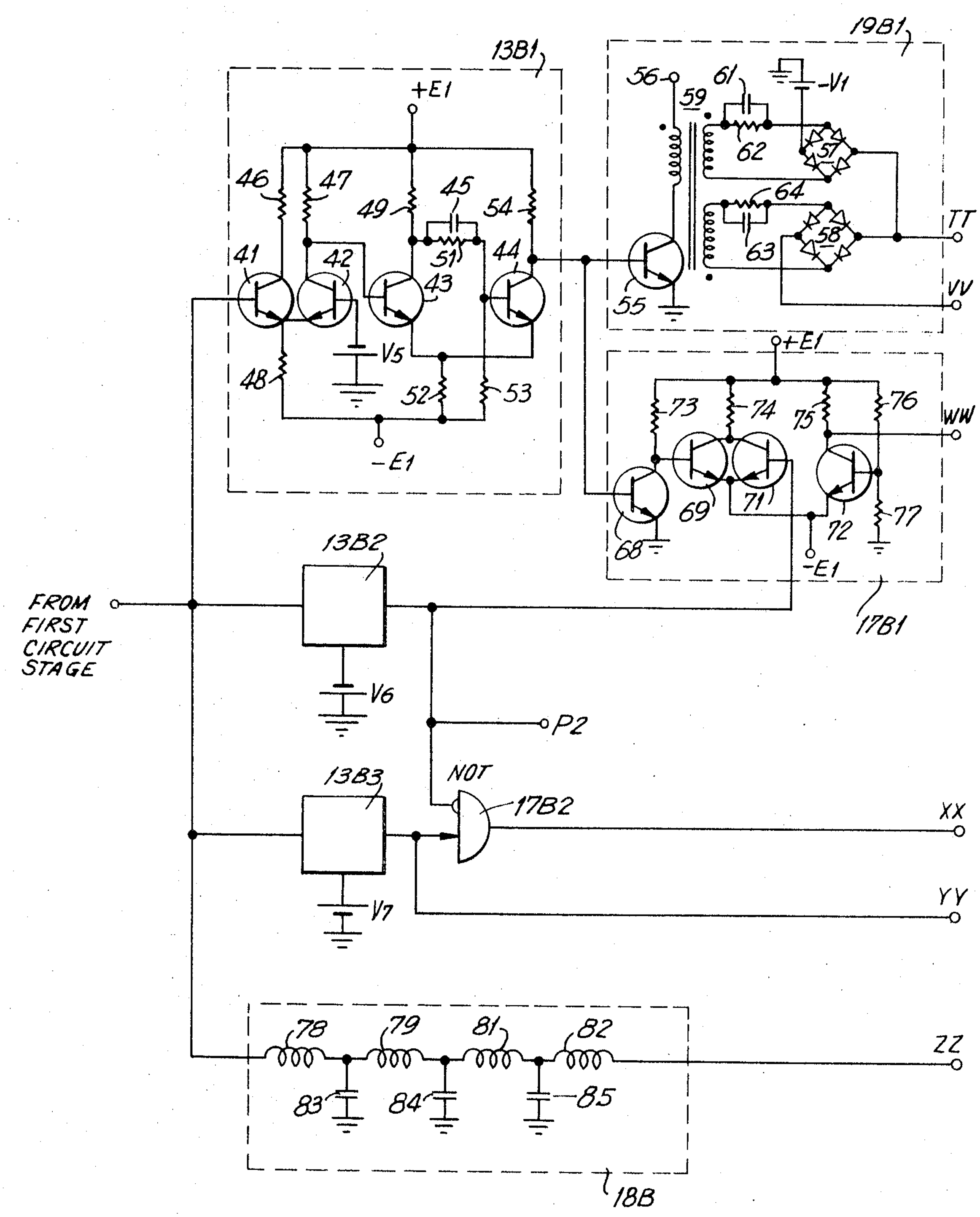
FIGS. 11*a* and 11*b*, is a circuit diagram of an embodiment of the second and third circuit stages of the nonlinear encoder of FIG. 9.
Figure 11B:
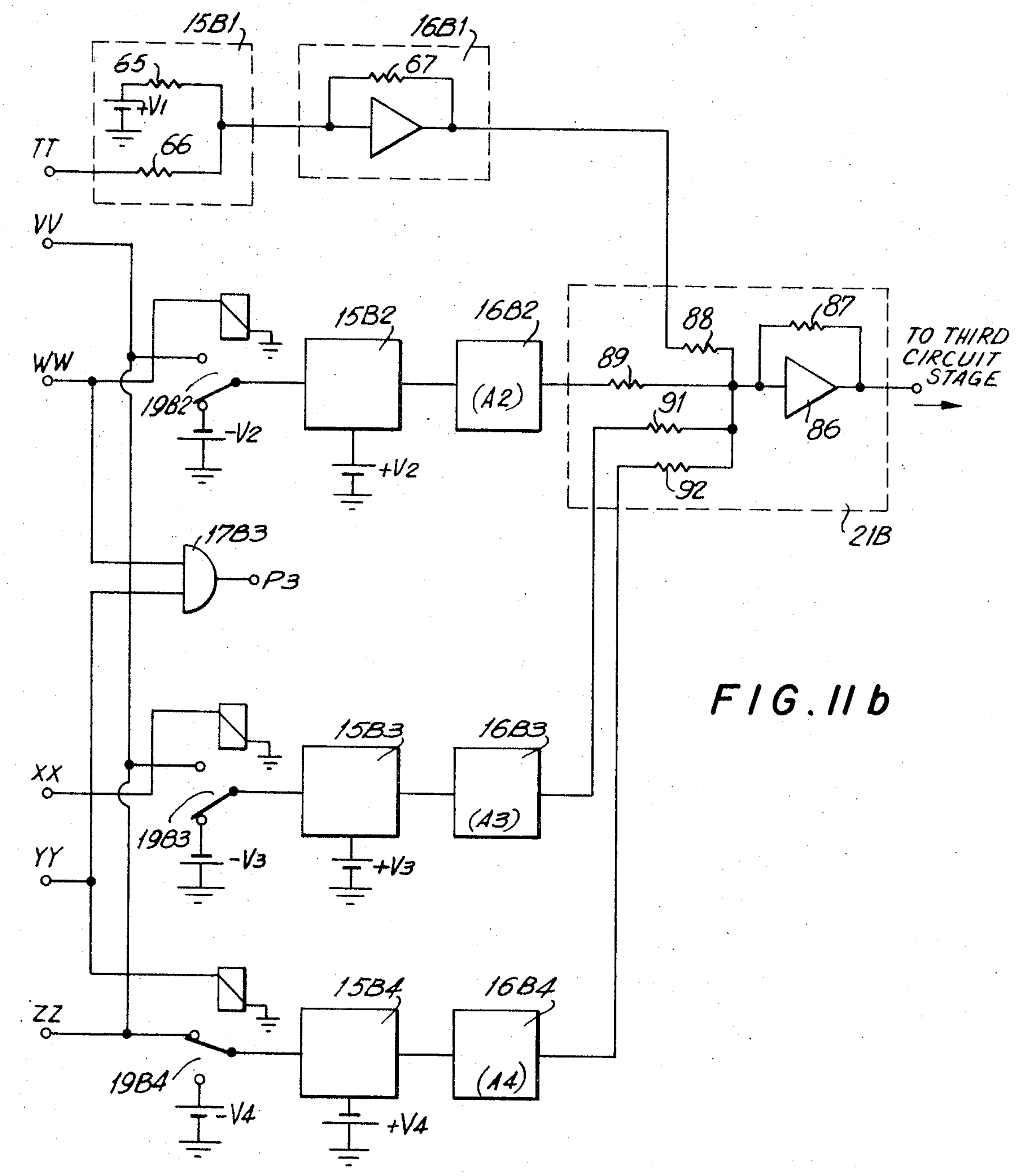

In FIG. 11, which comprises FIGS. 11*a* and 11*b*, the circuitry for each of the PCM code output circuit 13B1, the switch 19B1, the bias circuit 15B1, the amplifier 16B1, the OR gate 17B1, the adder 21B and the delay line 18B is shown. The remaining corresponding circuits of the second circuit stage are identical to those illustrated and are therefore indicated in block form. The PCM code output circuit 13B1 comprises a plurality of transistors 41, 42, 43 and 44, a DC voltage source providing V5 volts, a capacitor 45, and a plurality of resistors 46, 47, 48, 49, 51, 52, 53 and 54. These components are connected to form a differential amplifier circuit and a Schmitt trigger circuit. The differential amplifier circuit comprises the resistors 46 and 47, the transistors 41 and 42, the resistor 48 and the source of voltage. The remaining components are connected to form the Schmitt trigger circuit.

When the input signal supplied from the first circuit stage is greater than the comparison voltage V5, a potential greater than the emitter potential of the transistor 43 is applied to the base electrode of said transistor. The transistor 43 is thus switched to its conductive condition and the transistor 44 is switched to its nonconductive condition. Thus, when the input signal supplied to the second circuit stage is greater than V5, the comparator of the PCM code output circuit 13B1 produces a positive output pulse.

The switch 19B1 comprises a transistor 55, a full-wave rectifier 57 and a full-wave rectifier 58. The full-wave rectifier 57 is coupled to the collector electrode of the transistor 55 via a transformer 59 and a CR circuit comprising a capacitor 61 and a resistor 62. The rectifier 58 is coupled to the collector electrode of the transistor 55 via the transformer 59 and a CR circuit comprising a capacitor 63 and a resistor 64. When the input signal to the second circuit stage is greater than V5, the base electrode of the transistor 55 has a positive potential applied thereto, so that said transistor is switched to its conductive condition and current flows through the transformer 59. The transformer 59 is a wideband transformer. Thus, during the supply of input pulses, the full-wave rectifier 57 is in operative condition and the full-wave rectifier 58 is in inoperative condition, so that a negative bias −V1 is applied to the bias circuit 15B1. This corresponds to the fact, as shown in FIG. 9, that the switch arm of the switch 19B1 is connected to the voltage source −V1.

When the input signal to the second circuit stage is less than V5, the transistor 55 is switched to its nonconductive condition, the full-wave rectifier 57 becomes inoperative and the full-wave rectifier 58 becomes operative. This is due to the bias provided by the charge stored in the capacitors 61 and 63 during the period that the transistor 55 is in its conductive condition. The capacitors 61 and 63 must thus have large capacitances.

The bias circuit 15B1 comprises a pair of resistors 65 and 66 and a DC source of voltage or battery which provides V1 volts. The amplifier 16B1 comprises an amplifier and a feedback 67. The OR gate 17B1 comprises a plurality of transistors 68, 69, 71 and 72 and a plurality of resistors 73, 74, 75, 76 and 77. The components of the OR gate 17B1 function as an inverter at one of the inputs of said OR gate. That is, the OR gate 17B1 transfers an output signal when a zero input signal is supplied to the base electrode of the transistor 68 and an input signal of 1 is supplied to the base electrode of the transistor 71.

If a zero input signal is supplied to the base electrode of the transistor 68 of the OR gate 17B1, said transistor is switched to its nonconductve condition and the transistor 69 is switched to its nonconductive condition. The transistor 72 is then switched to its nonconductive condition and a positive output pulse is produced by the OR gate. If a signal of 1 is supplied to the base electrode of the transistor 71, said transistor is switched to its conductive condition and switches the transistor 72 to its nonconductive condition.

The delay line 18B comprises a plurality of inductances 78, 79, 81 and 82 and a plurality of capacitances 83, 84 and 85 connected in a known manner. The adder 21B comprises an amplifier 86 having a feedback 87, and a plurality of resistors 88, 89, 91 and 92.

The third circuit stage is similar to the second circuit stage in circuitry.

Each of the switches 19B1, 19B2, 19B3, 19B4, 19C1 and 19C2 of FIG. 9 is indicated symbolically as a mechanical switch, as is each of the switches 19B2, 19B3 and 19B4 of FIG. 11*b*, although each of such switches is an electronic switch as shown in FIG. 11*a* which illustrates the circuitry of the switch 19B1.

While the invention has been described by means of specific examples and in a specific embodiment, we do not wish to be limited thereto, for obvious modifications will occur to those skilled in the art without departing from the spirit and scope of the invention.

We claim:

1. A nonlinear encoder comprising a plurality of circuit stages connected in cascade, each of said circuit stages having input and output characteristics expressed in terms of a horizontal coordinate axis representing input signals and a vertical coordinate axis representing output signals as a plurality of nonoverlapping continuous straight line segments extending between a minimum level and a maximum level of an output signal and each of said circuit stages producing code output signals corresponding to the levels of said input signals, the characteristic of one of said circuit stages having a number of nonoverlapping continuous straight line segments and the characteristic of a succeeding one of said circuit stages having a lesser number of nonoverlapping continuous straight line segments, at least one of said circuit stages comprising analog signal input means for providing an input signal, a plurality of PCM code output circuits connected to said signal input means each having a predetermined reference threshold level different from that of the others for comparing the reference threshold level with the level of the input signal and providing the comparison results as PCM signals, delay means connected to said signal input means for delaying the input signal, a plurality of bias circuits each adding a different bias voltage to the output of the delay means, a plurality of switching means for applying bias voltages to the input signal in accordance with the output signals of the PCM code output circuits, a plurality of amplifier means for amplifying the output signals to which a bias voltage is applied, adding means connected to said amplifier means for adding the outputs of said amplifier means and output means connected to the adding means for providing an output signal.

2. A nonlinear encoder as claimed in claim 1, wherein the first of said circuit stages comprises a circuit arrangement for determining the polarity of the input signal.

3. A nonlinear encoder as claimed in claim 2, wherein one of said circuit stages comprises a quaternary circuit arrangement and another of said circuit stages succeeding said one of said circuit stages comprises a binary circuit arrangement.

4. A nonlinear encoder as claimed in claim 3, wherein the second of said circuit stages comprises a quaternary circuit and the third of said circuit stages comprises a binary circuit arrangement.

5. A nonlinear encoder as claimed in claim 4, wherein the first of said circuit stages comprises a PCM code output circuit, rectifier means, input means for supplying an input signal to said PCM code input circuit and said rectifier means, a bias circuit connected to said rectifier means for adding a bias voltage to the output of said rectifier means, and amplifier means connected to said bias circuit for amplifying the biased voltage.

6. A nonlinear encoder as claimed in claim 4, wherein the second of said circuit stages comprises a plurality of PCM code output circuits having different comparison levels, delay means, input means for supplying an input signal to said PCM code output circuits and to said delay means in common, a plurality of bias circuits each adding a different bias voltage to the output of said delay means, a plurality of amplifier means each connected in series circuit arrangement with a corresponding one of said bias circuits and each providing a different amplification, adding means connected in common to said amplifier means, a plurality of sources of voltage, and a plurality of switching means controlled in operation by said PCM code output circuits, each selectively connecting a corresponding one of said series circuit arrangements to said delay means and each selectively connecting a corresponding one of said series circuit arrangements to a corresponding source of voltage.

7. A nonlinear encoder as claimed in claim 4, wherein the third of said circuit stages comprises a PCM code output circuit, delay means, input means for supplying an input signal to said PCM code output circuit and to said delay means, a pair of bias circuits each adding a different bias voltage to the output of said delay means, a pair of amplifier means each connected in series circuit arrangement with a corresponding one of said bias circuits and each providing a different amplification, adding means connected in common to said amplifier means, a pair of sources of voltage, and a pair of switching means each controlled in operation by said PCM code output circuit, each selectively connecting a corresponding one of said series circuit arrangements to said delay means and each selectively connecting a corresponding one of said series circuit arrangements to a corresponding source of voltage.

8. A nonlinear encoder as claimed in claim 5, wherein the second of said circuit stages comprises a plurality of PCM code output circuits having different comparison levels, delay means, input means for supplying an input signal to said PCM code output circuits and to said delay means in common, a plurality of bias circuits each adding a different bias voltage to the output of said delay means, a plurality of amplifier means each connected in series circuit arrangement with a corresponding one of said bias circuits and each providing a different amplification, adding means connected in common to said amplifier means, a plurality of sources of voltage, and a plurality of switching means controlled in operation by said PCM code output circuits, each selectively connecting a corresponding one of said series circuit arrangements to said delay means and each selectively connecting a corresponding one of said series circuit arrangements to a corresponding source of voltage, and wherein the third of said circuit stages comprises a PCM code output circuit, delay means, input means for supplying an input signal to said PCM code output circuit and to said delay means, a pair of bias circuits each adding a different bias voltage to the output of said delay means, a pair of amplifier means each connected in series circuit arrangement with a corresponding one of said bias circuits and each providing a different amplification, adding means connected in common to said amplifier means, a pair of sources of voltage, and a pair of switching means each controlled in operation by said PCM code output circuit, each selectively connecting a corresponding one of said series circuit arrangements to said delay means and each selectively connecting a corresponding one of said series circuit arrangements to a corresponding source of voltage.